United States Patent [19]

Kamuro et al.

[11] Patent Number: 4,556,580
[45] Date of Patent: Dec. 3, 1985

[54] METHOD OF REPAIRING PIPES LAID UNDERGROUND

[75] Inventors: Takashi Kamuro, Kawasaki; Hisao Ootsuga, Yokohama; Isao Saito, Kawasaki; Motoyuki Koga, Tokyo, all of Japan

[73] Assignees: Tokyo Gas Co., Ltd.; Hakko Co., Ltd., both of Tokyo, Japan

[21] Appl. No.: 685,285

[22] Filed: Dec. 24, 1984

[30] Foreign Application Priority Data

Dec. 28, 1983 [JP] Japan ................. 58-246635

[51] Int. Cl.$^4$ .......................... B05D 7/22; B05D 1/42
[52] U.S. Cl. ............................ 427/8; 427/140; 427/142; 427/230; 427/238; 427/239
[58] Field of Search .................. 427/8, 140, 142, 230, 427/238, 239

[56] References Cited

U.S. PATENT DOCUMENTS 3,753,766  8/1973  Brown et al. ............... 427/142 X

Primary Examiner—James R. Hoffman
Attorney, Agent, or Firm—Martin A. Farber

[57] ABSTRACT

A method for repairing pipes laid underground, such as gas pipes, consisting of a main supply pipe from which numerous distribution pipes branch off to supply the individual users, the method using resin to repair the main supply pipe and the distribution pipes from the inside while in their buried state.

The repair method of this invention is characterized by the fact that, having repaired the main supply pipe and the distribution pipe in successive operations, whether the repairs to the main supply pipe and the distribution pipes have been done properly or not can be confirmed on completion of the repairs by carrying out sealage tests on the distribution pipes and the main supply pipe.

4 Claims, 7 Drawing Figures

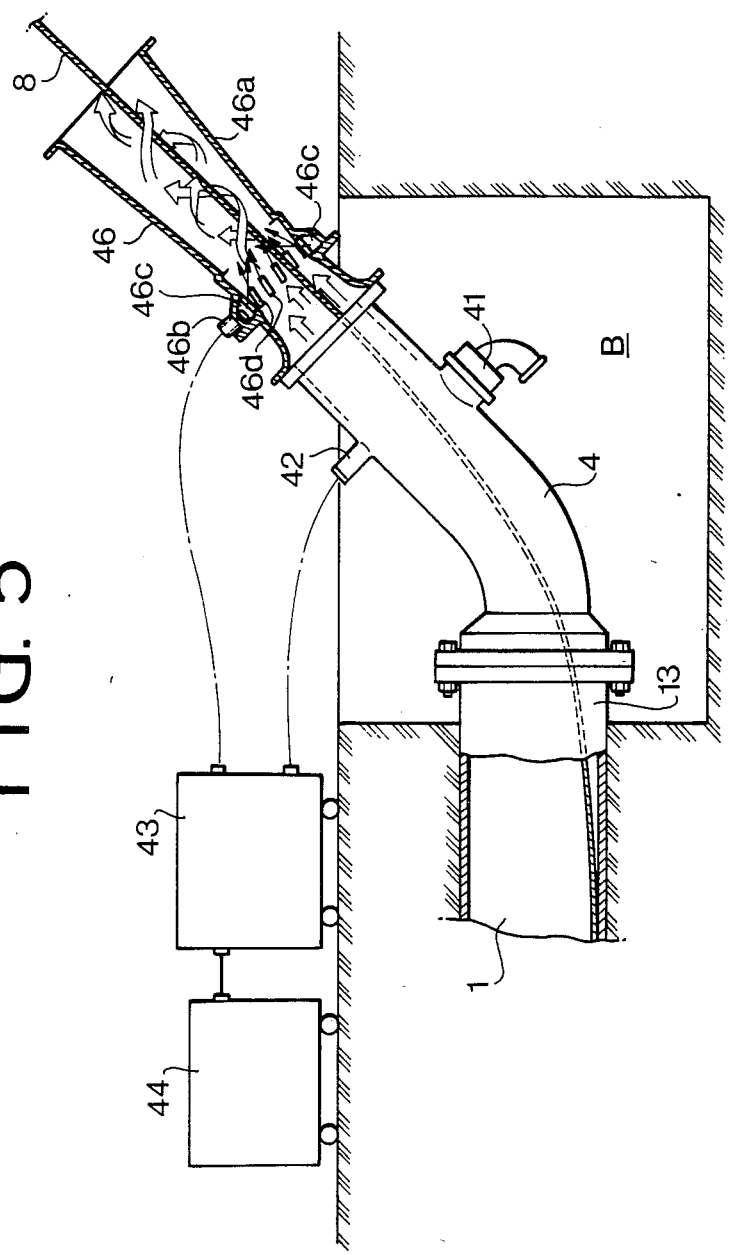

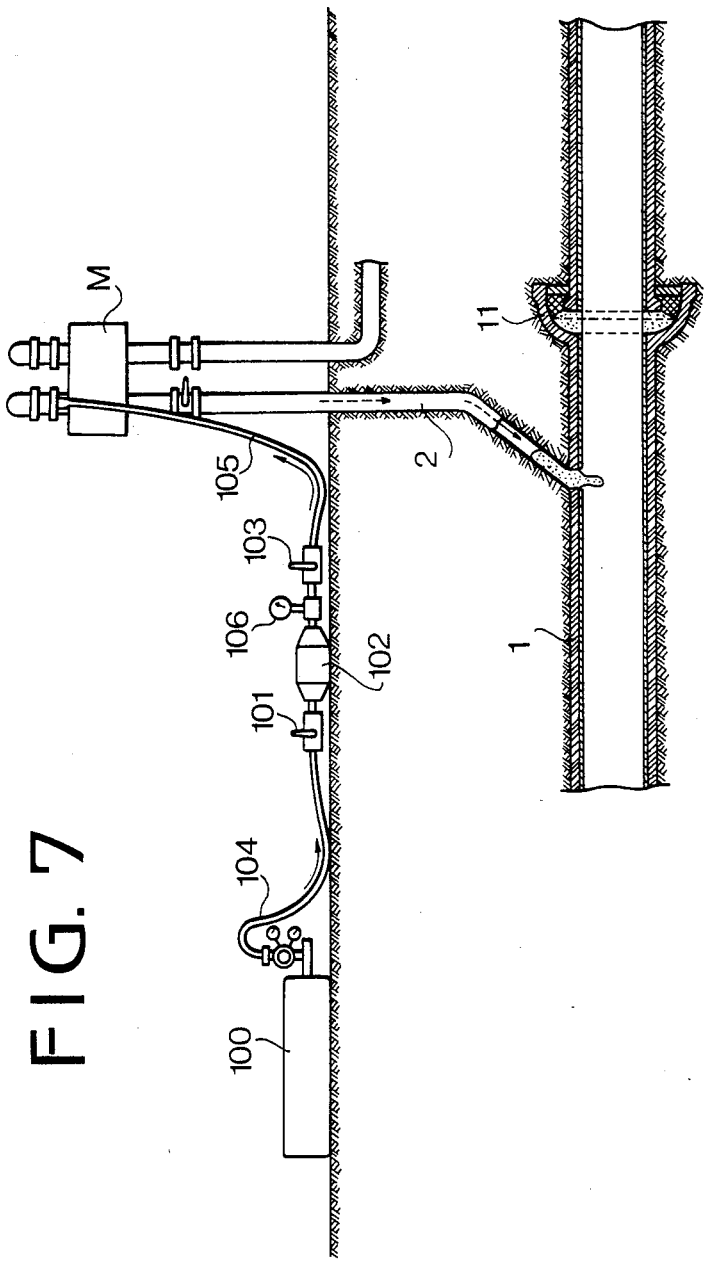

METHOD OF REPAIRING PIPES LAID UNDERGROUND

BACKGROUND OF THE INVENTION

This invention relates to a method for repairing pipes laid underground, such as gas pipes, in their buried state, from the inside, using resin.

Underground pipes, such as gas pipes, generally consist of a main supply pipe commonly known as the "mains" located under the road, with numerous distribution pipes branching off to supply individual users with commodities such as gas. The distribution pipes leading from the mains to general household users generally consist of relatively small diameter pipes, and due to their small wall thickness are susceptible to developing leaks due to corrosion in the course of aging and deterioration. On the other hand, for mains laid under roads, pipe in the form of cast iron tubes joined together by pipe joints is used, both pipe diameter and wall thickness being larger compared to the distribution pipes, and the risk of leaks due to corrosion being small. But the pipe joints are susceptible to developing leaks due to changes in mating conditions and formation of gaps caused by the weight of vehicles passing over the pipe, or by distortion of strata due to earthquakes.

In order to repair such leaks, and for preventive maintenance against such leaks, it has been proposed in recent years to repair the pipes from their inside while the pipes are left underground, the distribution pipes being repaired internally by forming a layer of resin lining, and the mains by filling the pipe joints with resin, to enhance their sealage.

The invention seeks to provide a method for repairing underground pipes, under which both the distribution pipes and the mains can be repaired in successive operations, and under which tests as to whether the repairings have been made properly can be made in the process, enabling repairing operations to be performed efficiently while confirming the adequacy of the work.

SUMMARY OF THE INVENTION

The object of the present invention is to repair the mains and distribution pipes mentioned above in their buried state from their inside using resin, this invention is characterized by first performing a repairing operation on the distribution pipes, in which the distribution pipes are repaired from their inside by forming a layer of resin lining on their inner surface, next performing a repairing operation on the mains in which necessary repairing is made while shifting resin by drawing a pig through the mains allowing resin to enter and block the entrances to distribution tubes in the process, followed by a sealage testing operation on the distribution pipes and a sealage testing operation on the mains in which the sealage is confirmed by monitoring internal pressures in the distribution pipes and in the mains behind the shifting resin respectively, finally performing a purging operation for resin intruding distribution pipes in which pressurized air is introduced into the distribution pipes to expel the resin blocking their entrances into the mains.

The mains is divided into sections of certain length suitable for the repairing operations.

The blockage of entrances to distribution pipes with resin enables sealage tests to be made on the repaired distribution pipes. Each distribution pipe is provided on its outlet with a relief valve set to release pressure above a predetermined value, with an orifice on its outlet and a sealage testing unit equipped with a pressure gauge on its inlet. When resin enters and blocks the entrance to the distribution pipe during the mains repairing operation, the change in internal pressure in the distribution pipe before and after blockage is detected by the pressure gauge to enable confirmation of its sealage.

The blockage of entrances to distribution pipes with resin also enables sealage test to be made continuously for the repaired portion of the mains behind the shifting resin and pig. An air supply means is provided to supply the pressure inside the mains required for sealage testing.

The mains is provided with a jet current generator which causes a high speed air flow through the mains to scatter and disperse the resin flowing out of the distribution pipes into the mains during the distribution pipe repairing operation.

The other objects and features of this invention will be apparently understood from the following description with reference to the accompanying drawings.

BRIEF DESCRIPTION OF THE DRAWINGS

FIG. 5 is an enlarged side view of the jet current generator.

FIG. 7 is a side view showing another method for expelling resin from entrances to distribution pipes.

DETAILED DESCRIPTION OF THE PREFERRED EMBODIMENT

Figure 1:
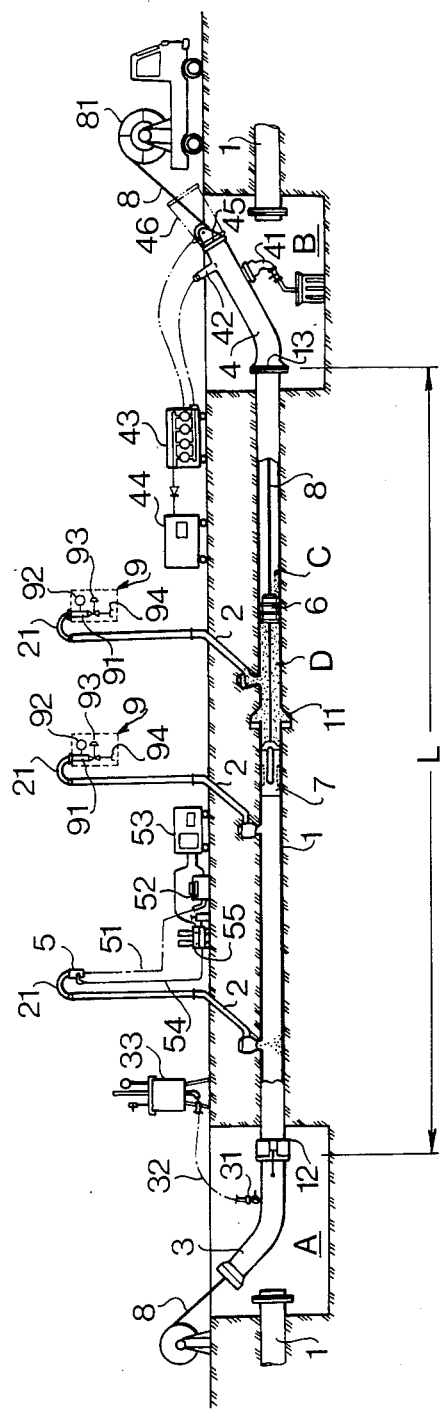
FIG. 1 is a schematic view showing an embodiment of the repairing method of this invention.
Figure 4:
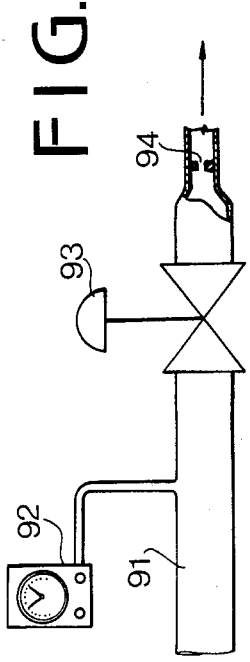
FIG. 4 shows the main components of the sealage testing unit.

Referring to FIG. 1 which shows the entire repairing operation in schematic form, reference number 1 indicates the pipe to be repaired, laid under ground such as beneath roads, in conventional manner by joining cast iron tubes of certain lengths together by pipe joints 11 such as those of the water mains type. Reference number 2 indicates the distribution pipes branching off from the main pipe, or mains 1 to supply individual users with gas, with ends exposed above ground surface and connected to gas meters at each user. Many distribution pipes 2 branch off from the mains 1, and their number may be very large depending on the housing density in the area.

To repair said piping, the mains 1 is first divided into sections L of certain length (e.g. 100 meters) suitable for the repairing operation. One of the separated ends 12 of a pipe section L is exposed in a shaft A opening onto the surface, while the other separated end 13 is exposed in a shaft B also opening onto the surface. On one separated end 12 is detachably connected an upwardly curving inlet guide tube 3 and on the other separated end 13 an upwardly curving outlet guide tube 4. On the inlet guide tube 3 is provided a resin charging port 31 through which resin is supplied, and which is connected to a resin injector 33 by hose 32. On the outlet guide tube 4 are provided, a resin discharging port 41 through which left over resin is drained after completion of the repairing operation, and an air pressurization port 42 for introducing pressurized air into the mains 1 and which is connected to a compressor 44 via a pressure control unit 43. The end of outlet guide tube 4 is sealed by a detachable lid 45 provided with an exit for tow cable 8, and which can be removed and replaced by a jet current generator 46 indicated by broken lines in FIG. 1.

A tow cable 8 is inserted from the end of inlet guide tube 3 and passed through the mains 1 to be drawn out of the outlet guide tube 4. By pulling the end of tow cable 8 in by means of a winch 81, a tandem pair of pigs 6, 7 attached to the tow cable 8 is led into the mains 1, with low viscosity resin C supplied in front of the first pig 6 in front, and joint filling resin D supplied in front of the second pig 7 behind. Mending of pipe joints 11 along the mains 1 is made while drawing the pigs 6, 7 through the mains from one end of the pipe section to the other.

For repairing the distribution pipes 2, a resin injecting apparatus 5 is attached to each distribution pipe, for example by disconnecting the gas meter at its joint on the exposed end of distribution pipe 2. Each resin injecting apparatus 5 has an air intake and a resin nozzle which are not shown in FIG. 1, the air intake being connected by hose 51 to a blower 52 driven by generator 53, and the resin nozzle being connected to a resin pump 55 by pipe 54. Resin fed by the resin pump 55 is mixed and diffused in the air flow generated by the blower 52 in the resin injecting apparatus 5, and blown into distribution pipe 2 to repair it from inside by forming a layer of resin lining on its inside wall.

According to this invention, on repairing the underground piping comprising of the mains 1 and distribution pipes 2 described above, the repairing operation on the inside wall of each distribution pipe 2 branching off from the mains, by formation of a layer of resin lining on the pipe inside is performed as the first step prior to other operations.

On each distribution pipe 2 that has been repaired, the resin charging apparatus attached at the meter joint is removed and a separate sealage testing unit 9 is attached instead.

The said sealage testing unit 9 consists of a pipe 91 to be connected to the end of distribution pipe 2, provided with an auto-recording pressure gauge 92 and a relief valve 93 set to release pressure above a predetermined level, with an orifice 94 on its outer end. By adjusting the releasing pressure on relief valve 93, if the internal pressure within the distribution pipe 2 exceeds the predetermined level for example, relief valve 93 allows air within the pipe 91 to escape through the orifice 94, but also if sufficient amount of air is being supplied into pipe 91, the pressure within pipe 91 is prevented from falling below that determined by the fluid dynamic drag of orifice 94. On the other hand if insufficient amount of air is supplied into pipe 91, the air in pipe 91 is allowed to escape through orifice 94 until the internal pressure in pipe 91 matches the predetermined value set by relief valve 93.

When repairing said distribution pipes 2, the lid 45 on the end of the outlet guide tube 4 is removed, and replaced with a jet current generator 46 (indicated by broken lines in FIG. 1).

The jet current generator 46, (as shown in FIG. 5 in larger scale), consists of a tubular body 46a with an annular chamber 46c on its outside, provided with a nozzle 46b. The compressed air blown in from the nozzle 46b, due to the pressure and rotation given when blown into the chamber 46c, is released through openings 46d into the body 46a undergoing compression and expansion to cause a swirling flow in the body 46a, as indicated by the arrows. The resulting negative pressure draws a large amount of air out of the guide tube to be released from the open end of body 46a, causing a high velocity air flow in the mains 1 by the powerful suction and expulsion action. The nozzle 46b on the jet current generator 46 is connected to a compressor 44 via the afore-mentioned pressure control unit 43, so that high pressure air from the compressor 44 is blown into the annular chamber 46c. Although the jet current generator 46 may be attached on the other end of mains 1, on the inlet guide tube 3, since the jet current generator 46 requires a high pressure air supply, it is preferably located nearer to the compressor 44, on the outlet guide tube 4.

By attaching such a jet current generator 46 on the end of the outlet guide tube when repairing the distribution pipes from inside, because there exists a high velocity air flow within the mains 1 in the pipe section L caused by the jet current generator 46, the lining resin for internal repairing of distribution pipes flowing into the mains 1 from their branch-off points, is blown away by the said high velocity air flow and dispersed throughout the mains 1, avoiding local build-up of excess resin inside the mains 1.

Particularly in this case, as the tow cable 8 for pulling pigs 6, 7 rests inside the mains, and as the said dispersed resin runs down along the inside wall of mains 1 to collect at its bottom and adhere to tow cable 8, the excess resin can be removed from the mains 1 by drawing the tow cable 8 out of the mains 1 on completion of repairing operation on distribution pipes 2 branching off from the mains 1, by adhering to the tow cable 8.

On completion of the repairing operation on the distribution pipes 2 described above, the repairing operation on the mains 1 is performed as the second step.

Here, the first leading pig 6 and the second gap filling pig 7 are introduced into the mains 1 from the end of the inlet guide tube 3 under towage by tow cable 8, with low viscosity resin C such as primer of viscosity about 20 cps supplied in front of the first pig 6 and pipe joint filling resin D such as epoxy resin of viscosity about 100,000 cps supplied in front of the second pig 7 from the resin injector 33 through resin charging port 31. At the same time, pressurized air from compressor 44 is led into the mains 1 via pressure control unit 43 from the outlet guide tube 4, and led through the first pig 6 to exert an air pressure on the resin D in front of the second pig 7. The first pig 6 is provided with a passage for leading said pressurized air toward the second pig behind, so that the required pressure is exerted on resin D ahead of the second pig 7.

As the pigs 6, 7 are drawn through the mains 1 in this condition by pulling the tow cable 8 with the winch 81 at the required towing speed shifting resin along the mains 1, debris remaining in the mains 1 which has been cleaned beforehand, is wetted with resin C. Especially, as jute packing and other debris lying in the space in pipe joints 11 are removed by adhering to resin C when resin C passes pipe joints, infiltration of the space in pipe joints by joint filling resin D later in the repairing operation is facilitated.

Figure 2:
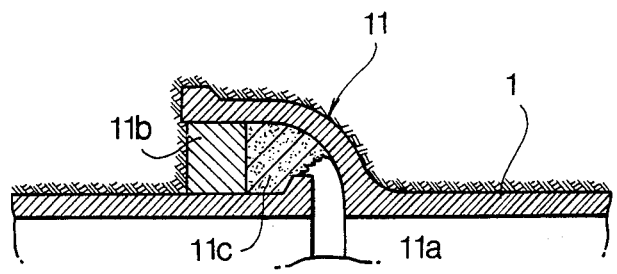
FIG. 2 is an enlarged cross sectional view of a pipe joint in the mains.

In resin D pushed forward by the second pig 7 under towage by tow cable 8, considerable pressure is generated just ahead of the second pig 7 due to viscous drag between resin D and the pipe wall, which together with the application of air pressure from the front, gives rise to a sufficiently large filling pressure in resin D. Hence, when resin D passes a pipe joint 11 which has developed a leak, resin D is forced into gap 11a shown in FIG. 2 by said filling pressure, the air in gap 11a being expelled through the leak, so that the gap is filled completely with resin. However, if pipe joint 11 has developed no leak, the air in gap 11a is compressed, inhibiting filling of gap 11a by resin D, and complete filling is not ensured.

Figure 3:
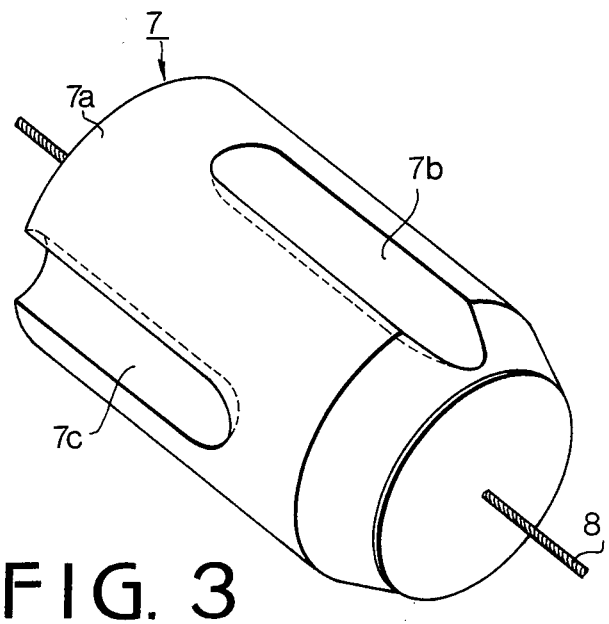
FIG. 3 is a perspective view of the second pig.

In order to solve this problem, the second pig 7, as shown in FIG. 3, is provided on the periphery of its main body 7a with channels 7b opening onto the front face, and channels 7c opening onto the rear face circumferentially separated from channels 7b but overlapping them in the longitudinal direction.

By using a pig 7 of such a configuration, resin D is shifted without escaping to the rear of pig 7 while the circumference of the pig main body 7a slides maintaining close contact with the inside wall of mains 1, but is forced through the channels 7b and into gaps 11a in pipe joint 11 under resin filling pressure when the pig reaches and passes a pipe joint 11, while air in gap 11a is expelled toward the rear through channels 7c, for substitution and saturation by resin to take place.

Although the time required in filling leaky pipe joints depends on the filling length of resin D ahead of second pig 7 and its towing speed, it has been learned from experience that approximately one minute will suffice.

With the repairing operation on pipe joints 11 thus performed, jute packing 11c sealed by lead 11b and gap 11a are saturated with resin, ensuring sealage at the pipe joints.

While the repairing operation on the mains 1 is performed, resin D enters and blocks the entrances to distribution pipes 2 when shifted through the mains 1, due to the pressure in the resin. However, the depth of entry of resin into distribution pipes 2 is not large, because the internal pressure within distribution pipes 2 is raised ahead of resin D by the entry of pressurized air supplied in front of the pig 6.

As the supply of pressurized air into distribution pipe 2 is cut off with the passing of resin D past the entrance to distribution pipe 2, the internal pressure within that distribution pipe 2 drops to a predetermined level set by relief valve 93, which is indicated on the auto-recording pressure gauge 92. The pressure should be 0.05–0.1 kg/cm$^2$, for example.

By monitoring the auto-recording pressure gauge 92 for a certain length of time, judgements can be made as to whether the repairing operation on the distribution pipes by formation of a layer of resin lining on the inside has been made properly. In other words, verifications can be made if there is no drop in pressure beyond the value set by the relief valve 93, that the repairing on distribution pipe is perfect, whereas if there is, that the repairing is imperfect, or that leaks still exist.

Figure 6:
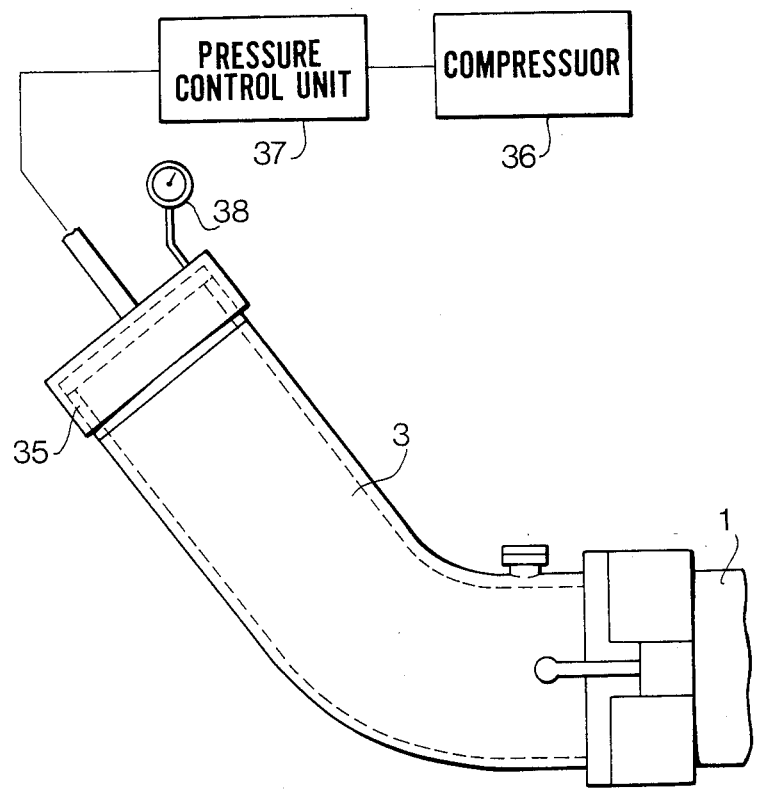
FIG. 6 is an enlarged side view of the inlet guide tube.

As the entrances to distribution pipes 2 are sealed in sequence as resin D shifts through the mains 1 by towing of pigs 6, 7, judgements can be made as to whether the repairing operation on pipe joints 11 along the mains 1 has been made properly, by monitoring the pressure gauge 38 fitted to lid 35 sealing the end of inlet guide tube 3. The judgements can be made for each pipe joint 11, each time resin D moves through a certain length and passes another pipe joint, or after the repairing is completed on the entire length of pipe section to be repaired. In other words, by supplying pressurized air of certain pressure, of the order 0.03–0.5 kg/cm$^2$ for example, into the mains 1 aft of the second pig 7, from a compressor 36 shown in FIG. 6 via pressure control unit 37, and monitoring the internal pressure within the mains 1 aft of the second pig 7 by means of pressure gauge 38, the successfulness of the repairing can be confirmed, since the internal pressure would fall due to existence of leaks if the repairing is imperfect. Also, by making this continuously in accordance with the shifting of resin D, checks can be made individually on the perfectness of each pipe joint.

After verifying the sealage on distribution pipes 2 and on mains 1, the resin D blocking the entrances to distribution pipes is removed. On this occasion, the sealage testing unit 9 is disconnected at the meter joint 21 at the end of distribution pipe 2, and blower 52 is reconnected in its place by hose 51, to force the resin intruding the entrance to the distribution pipe 2 out into the mains, by applying a pressure in the distribution pipe 2. A pressure regulator valve is preferably provided in between the blower 52 and hose 51 to adjust the pressure in this case.

For removing the resin blocking the entrance to distribution pipes 2, the means shown in FIG. 7 may be used as an alternative. The apparatus used here consists of a small air bottle 100 of capacity of the order of 3–4 liters, connected to the first valve 101, regulator valve 102, second valve and hoses 104, 105.

On completion of the repairing operations on the mains 1 and distribution pipes 2, the gas meter M is disconnected at the joint on the end of distribution pipe 2, and hose 105 is connected instead. By opening valves 101, 103 and releasing air in the bottle 100, decompressed air of about 0.3 kg/cm$^2$ pressure enters the distribution pipe 2 via hose 104, regulator valve 102 and hose 105. Although pressure gauge 106 connected to the regulator valve 102 would indicate a drop in pressure immediately as air in the distribution pipe breaks through the resin and into the mains 1, as considerable amount of resin can still be assumed to be adhering to the inside of distribution pipe 2, compressed air continues to be supplied for some time after the break through, for example, about 30 seconds. Valves 101, 103 are shut when resin is forced out of the distribution pipe 2 and the distribution pipe is thought to be sufficiently cleared. This completes the removal of blocking resin from one of the distribution pipes 2. The same operation is to be repeated for each distribution pipe 2.

This alternate system has the advantages over the one described before, in that it requires no heavy equipment such as a compressor, causes little noise and is safe. Also, the operation can be performed swiftly since only the air bottle, valves and hoses need to be moved about, facilitating transportation of equipment. This is particularly helpful, as the operation has to be completed on all distribution pipes 2 before the resin blocking the entrances to distribution pipes hardens.

This invention, as has been described in detail, enables repairings to be made on the mains and the distribution pipes in successive operations. It also enables confirmation to be made as to whether the repairings have been made properly on each of the pipe joints along the mains, and on each individual distribution pipe branching off from the mains, so that the repairing operations can be made while verifying and checking the perfectness of the work, thus improving the reliability of the repairing operations.

The invention also has the merit of making possible sealage testing of each distribution pipe repaired from the inside, which has previously been deemed impossible. Further, since sealage tests have been made on all distribution pipes, the object of the sealage test on the mains can be narrowed down to the pipe joints along the mains, facilitating sealage testing.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:

1. A method for repairing pipes laid underground in which a main pipe has plural distribution pipes branching off from the main pipe to supply users with commodities such as gas, characterized by the main pipe being divided into sections of certain length to be repaired when repairing said main pipe and distribution pipes from their inside using resin, repairs being carried out on the main pipe in each section to be repaired by shifting resin through the pipe by drawing a pig along the pipe toward one opening in the section to be repaired by inserting the resin used for the repairing and a pig which will be drawn through the pipe in order to push this resin along inside of the pipe from the other opening in the section to be repaired, allowing said resin to enter and block the entrance to each of the distribution pipes branching off from said main pipe when repairing said main pipe, enabling sealage testing to be made on the main pipe after each repair or after all the repairs have been carried out in the section which has been repaired, by the blockage of said entrances with resin.

2. A method for repairing pipes laid underground in which a main pipe has plural distribution pipes branching off from the main pipe to supply users with commodities such as gas, characterized by the main pipe being divided into sections of certain length to be repaired when repairing said main pipe and distribution pipes from their inside using resin, the first process being the performing of internal repairs on the distribution pipes branching off from the main pipe in a section to be repaired by forming a layer of resin lining on the pipe inside by inserting the resin used for the repairing from the end opening in each section to be repaired, then the second process being the performing of repairs on the main pipe by shifting resin through the pipe by drawing a pig along the pipe toward one opening in the section to be repaired by inserting the resin used for the repairing and a pig which will be drawn through the pipe in order to push this resin along inside of the pipe from the other opening in the section to be repaired, allowing said resin to enter and block the entrance to each of the distribution pipes branching off from said main pipe when repairing said main pipe, enabling sealage testing to be made on the distribution pipes repaired in the first process after repairing, by the blockage of said entrances with resin.

3. A method for repairing pipes laid underground in which a main pipe has plural distribution pipes branching off from the main pipe to supply users with commodities such as gas, characterized by the main pipe being divided into sections of certain length to be repaired when repairing said main pipe and distribution pipes from their inside using resin, the first process being the performing of internal repairs on the distribution pipes branching off from the main pipe in a section to be repaired by forming a layer of resin lining on the pipe inside by inserting the resin used for the repairing from the end opening in each section to be repaired, then the second process being the performing of repairs on the main pipe by shifting resin through the pipe by drawing a pig along the pipe toward one opening in the section to be repaired by inserting the resin used for the repairing and a pig which will be drawn through the pipe in order to push this resin along inside of the pipe from the other opening in the section to be repaired, allowing said resin to enter and block the entrance to each of the distribution pipes branching off from said main pipe when repairing said main pipe, next performing a sealage testing operation on the distribution pipes, in which the sealage of each distribution pipe is confirmed by monitoring the internal pressure within the pipe, then performing a sealage testing operation on the main pipe, in which the sealage of the main pipe is confirmed by monitoring the internal pressure within the main pipe aft of the shifting resin, and finally performing a purging operation on the resin blocking the entrances to distribution pipes, in which pressurized air is introduced into the distribution pipes to purge the blocking resin into the main pipe.

4. A method for repairing pipes laid underground according to claim 2 or 3 wherein the said sealage test on distribution pipes, having a sealage testing unit consisting of a relief valve set to release pressure above a predetermined value, with an orifice on its outlet and a pressure gauge on its inlet, being detachably connected to the free end of said distribution pipe, enabling confirmation of sealage on distribution pipes to be made when the entrances to the distribution pipes are blocked by resin, supplied into the adjoining main pipe when repairing the main pipe, entering under pressure in resin caused by the movement of resin, by monitoring with said pressure gauge the change in internal pressure within the distribution pipe in comparison to the predetermined value set before blockage.

* * * * *